US012746815B2

(12) United States Patent
Levinson et al.

(10) Patent No.: US 12,746,815 B2
(45) Date of Patent: Sep. 29, 2026

(54) FUEL PUMP HANGER ASSEMBLY

(71) Applicant: 1340126 Ontario Inc., Ontario (CA)

(72) Inventors: Jack Levinson, Ontario (CA); Rajan Thiru, Ontario (CA)

(73) Assignee: 1340126 Ontario Inc. (CA)

( * ) Notice: Subject to any disclaimer, the term of this patent is extended or adjusted under 35 U.S.C. 154(b) by 32 days.

(21) Appl. No.: 19/043,897

(22) Filed: Feb. 3, 2025

(65) Prior Publication Data

US 2025/0178429 A1 Jun. 5, 2025

Related U.S. Application Data

(63) Continuation-in-part of application No. 18/242,973, filed on Sep. 6, 2023, now Pat. No. 12,215,657.

(30) Foreign Application Priority Data

Sep. 6, 2022 (CA) ..................................... 3172531

(51) Int. Cl.
*F16M 11/00* (2006.01)
*B60K 15/03* (2006.01)

(52) U.S. Cl.
CPC .... *B60K 15/03* (2013.01); *B60K 2015/03243* (2013.01)

(58) Field of Classification Search
CPC ...................... B60K 15/03; B60K 2015/03243
See application file for complete search history.

(56) References Cited

U.S. PATENT DOCUMENTS

| | | | | |
|---|---|---|---|---|
| 6,896,318 B2 * | 5/2005 | Marrs | B62D 27/02 | 296/180.2 |
| 7,984,925 B2 * | 7/2011 | Levin | B60K 15/067 | 280/833 |
| 2012/0060950 A1 * | 3/2012 | Okazono | F02M 37/00 | 137/565.34 |
| 2017/0334288 A1 * | 11/2017 | Rike | B60K 15/07 | |

* cited by examiner

*Primary Examiner* — Amy J. Sterling
(74) *Attorney, Agent, or Firm* — Christensen, Fonder, Dardi & Busse PLLC; Andrew H. Auderieth

(57) ABSTRACT

A fuel pump hanger assembly configured to fit two fuel pumps into the small opening of a fuel tank, even if the diameter of both fuel pumps combined is larger than the opening of the fuel tank. The fuel pumps may be inserted into the fuel tank one at a time, then assembled together through the small opening of the fuel tank. The parts self-locate inside the fuel tank and the assembly held together with bolts. This self-locating feature facilitates the assembly of all parts inside the small opening of the fuel tank. The hanger holds two common fuel pumps and comes with fittings for interfacing to the car's fuel and vapor lines.

7 Claims, 10 Drawing Sheets

FUEL PUMP HANGER ASSEMBLY

RELATED APPLICATIONS

The present application is a continuation-in-part of U.S. patent application Ser. No. 18/242,973, filed Sep. 6, 2023, which claims the benefit of Canadian Application No. 3,172,531, filed Sep. 6, 2022, which is hereby incorporated herein by reference in its entirety.

FIELD OF THE INVENTION

This invention relates to the general field of combustion engines, and more particularly to the field of fuel pumps.

BACKGROUND OF THE INVENTION

As car owners modify their cars with larger turbos and stronger engine internals to support more power, the demand to increase fuel supply go up. In some instances, a larger fuel pump is not enough to increase fuel supply to meet fuel demand. In this case, a $2^{nd}$ fuel pump will be needed to supplement the fuel supply of the $1^{st}$ fuel pump.

SUMMARY OF THE INVENTION

What is desired in one embodiment is a fuel pump hanger assembly configured to fit both fuel pumps into the small opening of a fuel tank, even though the diameter of both fuel pumps combined is larger than the opening of the fuel tank.

Therefore, there is provided a new pump hanger design that will securely hold both fuel pumps in the fuel tank while also having a modular design. This modular design allows both fuel pumps to be inserted into the fuel tank one at a time, then assembled together through the small opening of the fuel tank. The hanger is designed so that all parts self locate inside the fuel tank and is held together with bolts. This self locating feature is necessary to aid with the assembly of all parts inside the small opening of the fuel tank. The hanger holds two common fuel pumps and comes with all the fittings necessary to interface to the car's fuel and vapor lines.

In another embodiment, there is provided a variant pump hanger design for hanging only a single fuel pump.

DETAILED DESCRIPTION OF THE PREFERRED EMBODIMENTS

Figure 1:
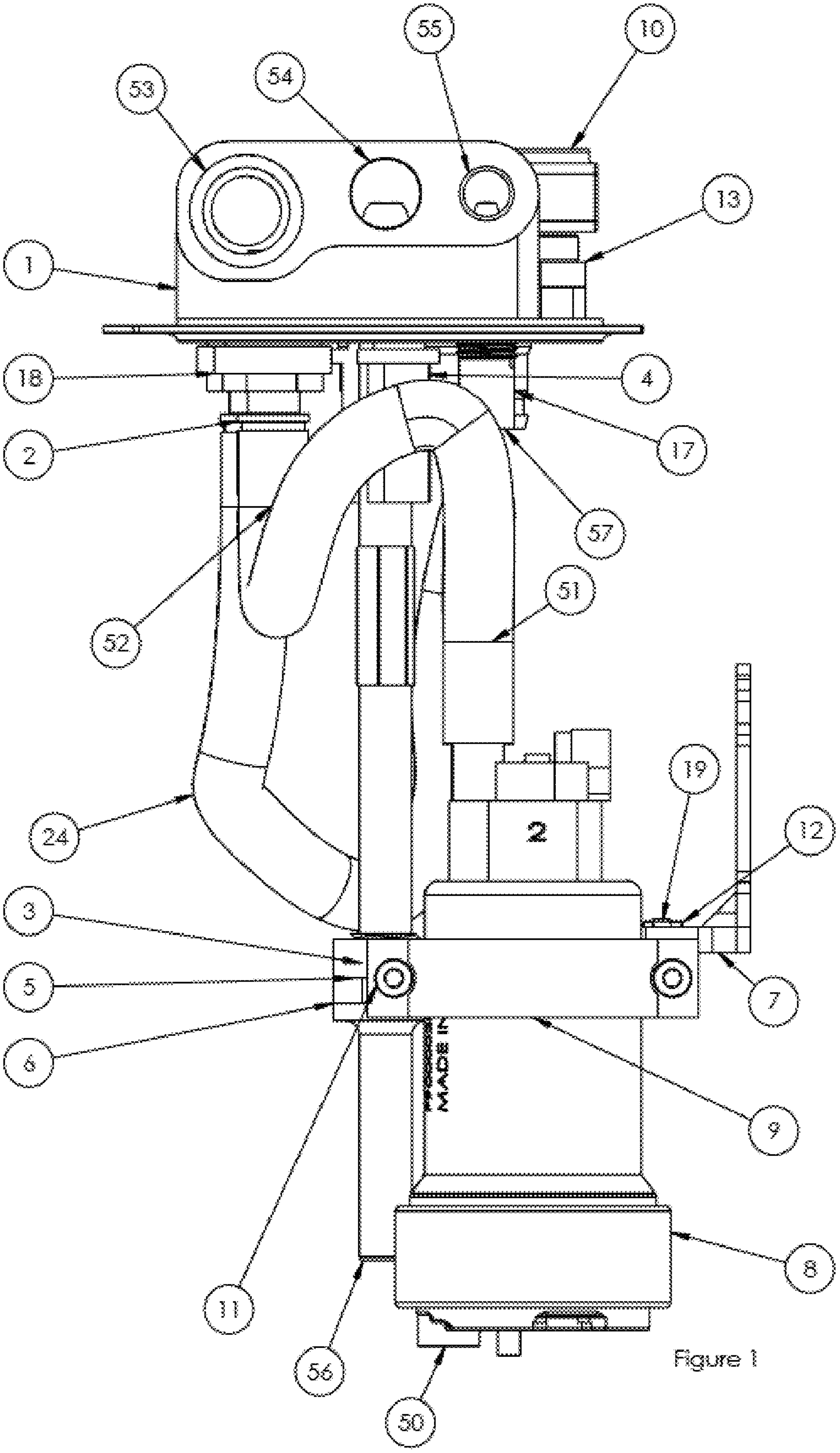
FIG. 1 is a view of the inlet/outlet of the hanger head, and a side profile of the fuel pumps.
Figure 2:
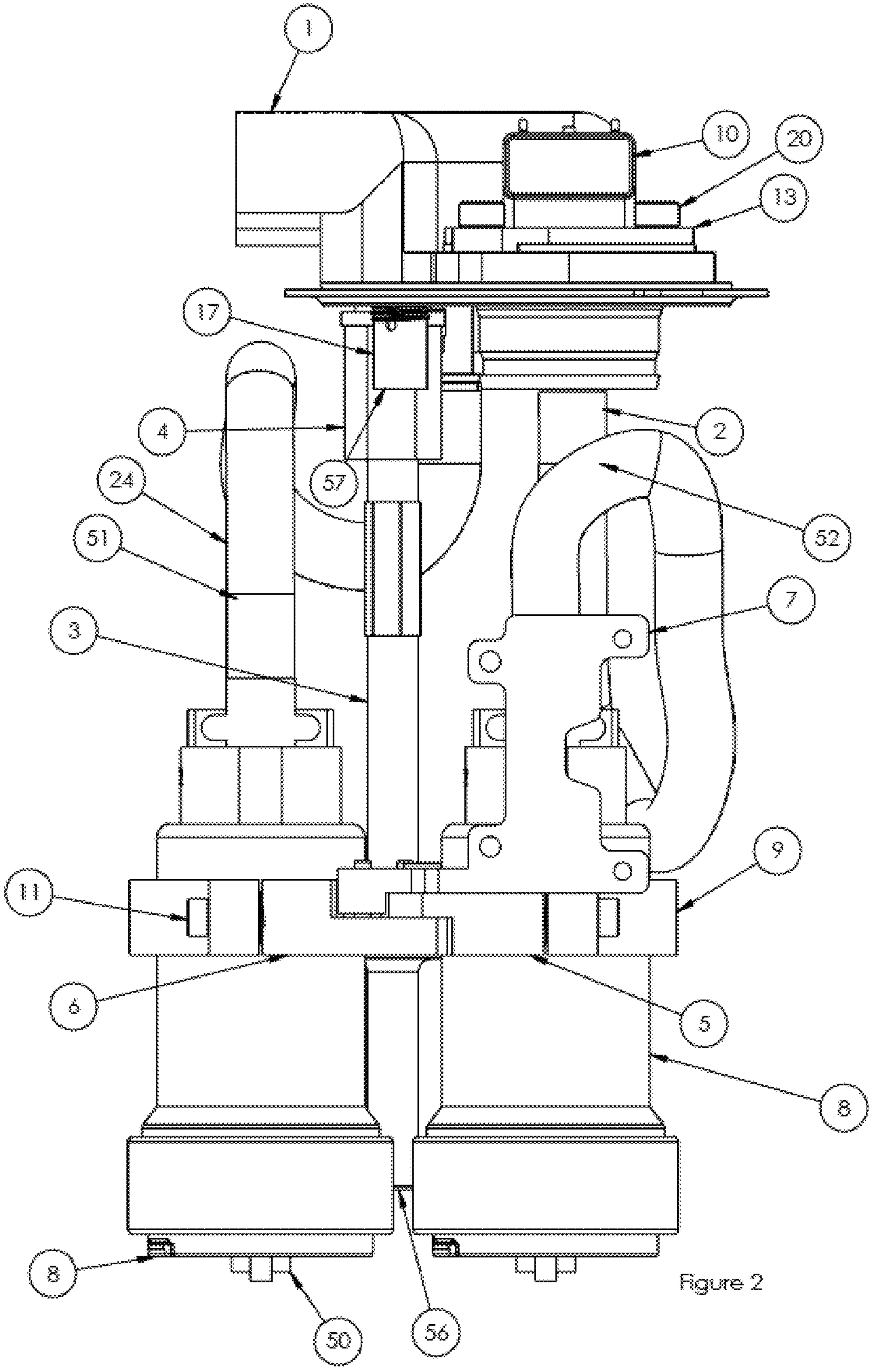
FIG. 2 is a front view of the hanger and shows the side profile of the hanger head.
Figure 3:
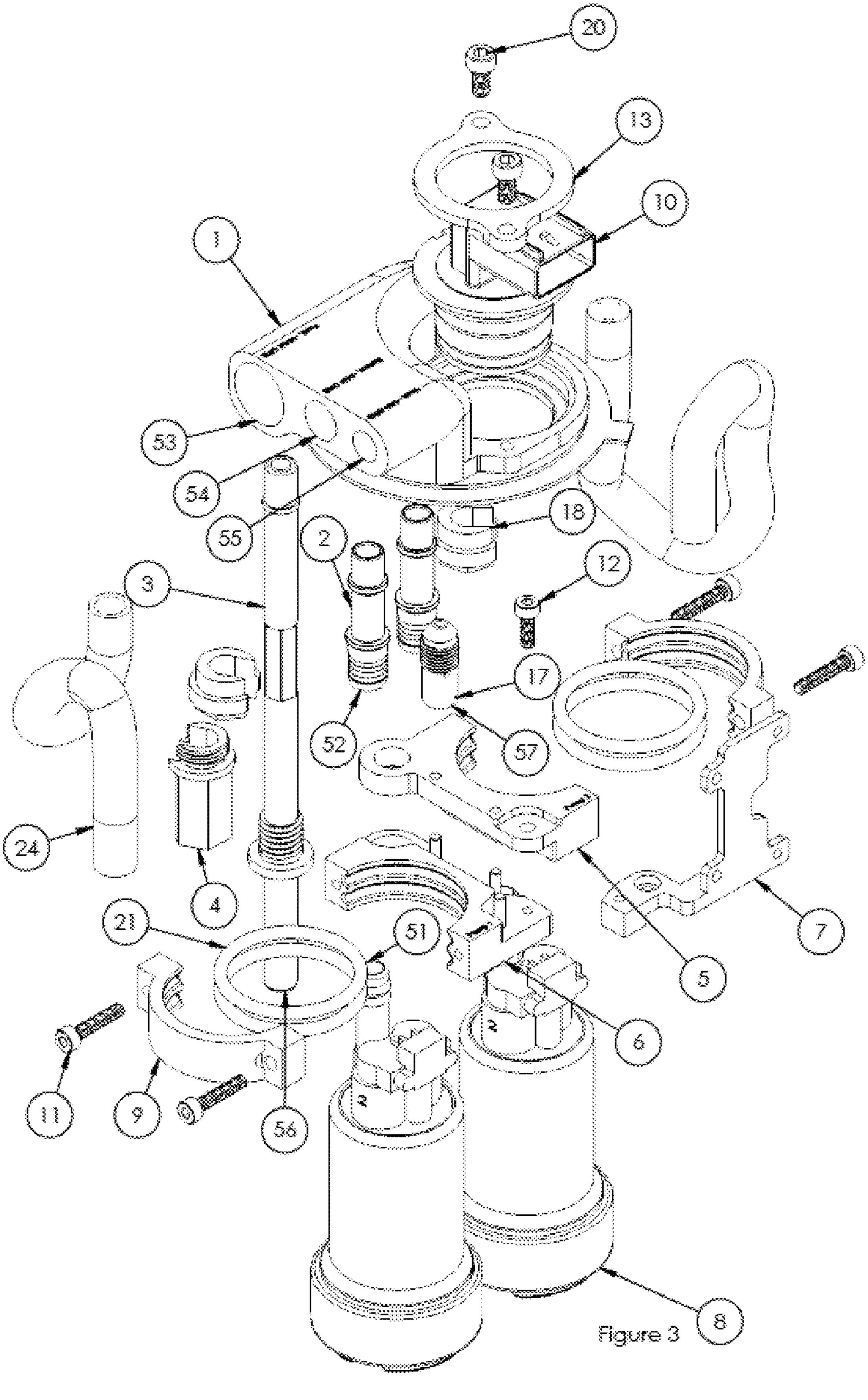
FIG. 3 is an exploded view of the hanger, showing all of the components.

1 is the top hat of the entire fuel pump hanger. It fastens to the fuel tank of the vehicle, fuel feed, return and vent lines which are plumbed to the ports in the top hat. The o-rings 21 are positioned around the fuel pumps 8. The o-rings are then placed into the grooves of brackets 5, 6, & 9. Bolts 11 are used to fasten bracket 9 to bracket 5 & 6. This squeezes and secures the fuel pumps 8 into place, and dampens the vibrations coming from the pumps. The large hole on bracket 6 is slipped over the top of shaft 3, and rests onto the collar on the shaft. The threaded hole on bracket 5 is then slipped over the top of shaft 3. The dowel pins on bracket 6 locates with the corresponding holes on bracket 5. Bracket 5 is then lowered and placed on top of bracket 6. Dowel pins are used for locating bracket 6 and 5 together when assembling everything inside the fuel tank. The thread on shaft 3 then screws into the threaded hole on bracket 5. Bracket 7 holds the fuel level sensor and also secures the front of bracket 5 and 6 together with bolt 12. The last dowel pin on bracket 6 interfaces with the hole on bracket 7. Bolt 12 is inserted into the counterbored hole on bracket 7 and fastens brackets 5, 6, & 7 together. The top of shaft 3 is inserted into a hole on top hat 1, and secured using the longer crescent nut 4. 2 is a quick connect fitting that allows the convoluted fuel tubes 24 to feed the top hat. This custom fitting (2) allows for easy assembly in tight spaces as it allows the fuel tubes to be swiveled and positioned easily without binding. 2 is held in place with 18, which is a crescent style nut that allows you to install the threaded nuts over a cylinder that is already pressed into a hole. The vapor-proof electrical bulkhead 10 fits into the large hole on the top of the top hat, it is sealed with an o-ring underneath. Bracket 13 is placed on top of electrical bulkhead 10 and is fastened with bolts 20.

Fuel is sucked into the fuel pumps via inlets 50. Fuel leaves the fuel pumps via port 51 then is fed to port 52 with submersible fuel tubes 24. The fuel then enters a cavity in the top hat and is fed to the fuel line via port 53. Not all fuel will be consumed by the engine, some fuel will be returned back to the fuel tank. The return line from the engine feeds fuel back into the tank via port 54. The fuel then travels down the hollow shaft 3 and exits into the fuel tank via port 56. Fitting 17 is a roll-over check-valve that allows fuel vapor to exit the tank, which prevents the fuel tank from being pressurized as fuel heats and expands in the tank. The roll-over check-valve also prevents fuel from exiting the tank should the vehicle become inverted due to a collision etc. Excess vapor pressure is fed into port 57, enters a cavity in the top hat 1, then exits the top hat via port 55.

Figure 4:
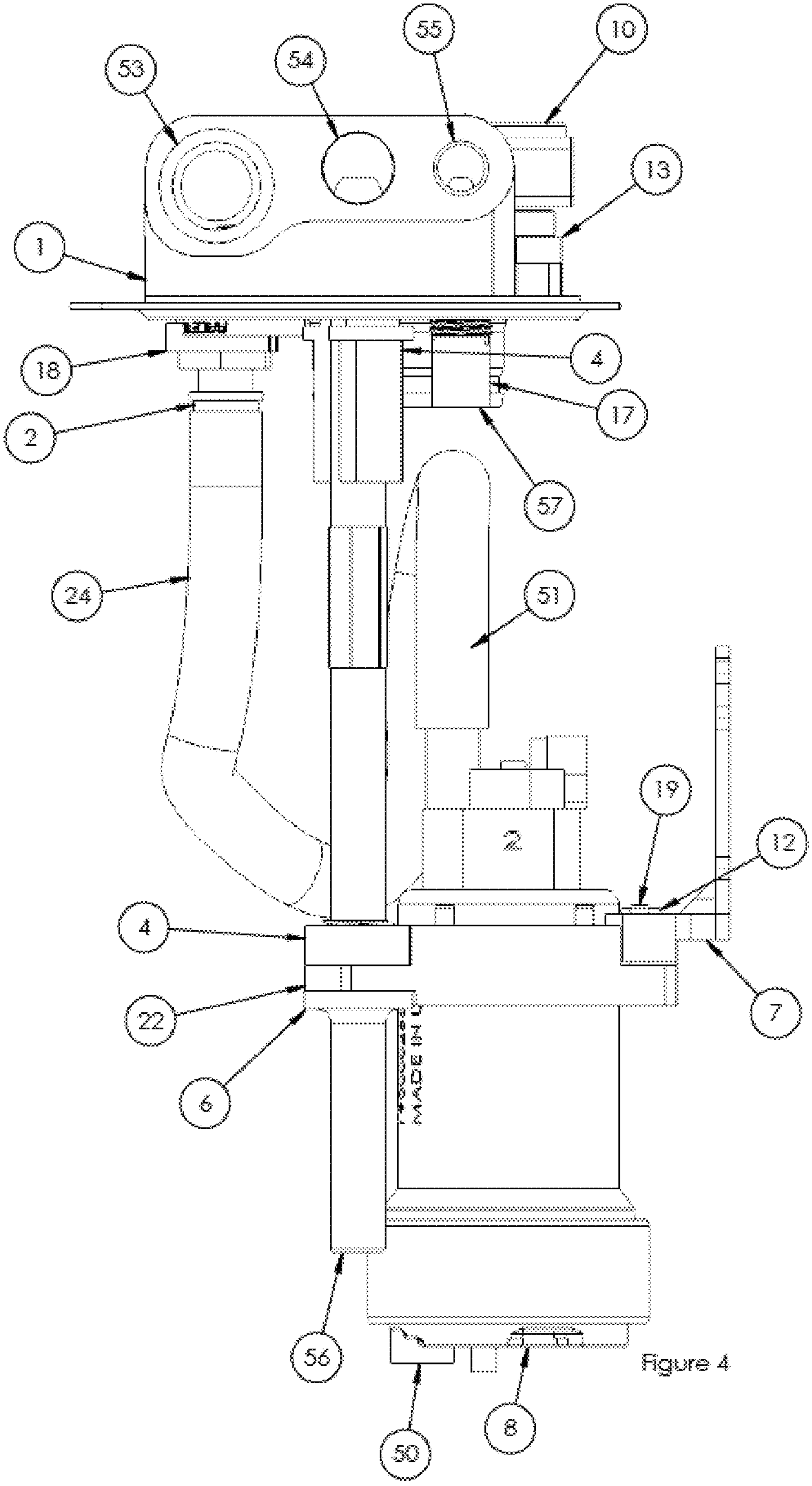
FIG. 4 is a view of the inlet/outlet of the hanger head, and a side profile of the fuel pump, of an alternative embodiment.
Figure 5:
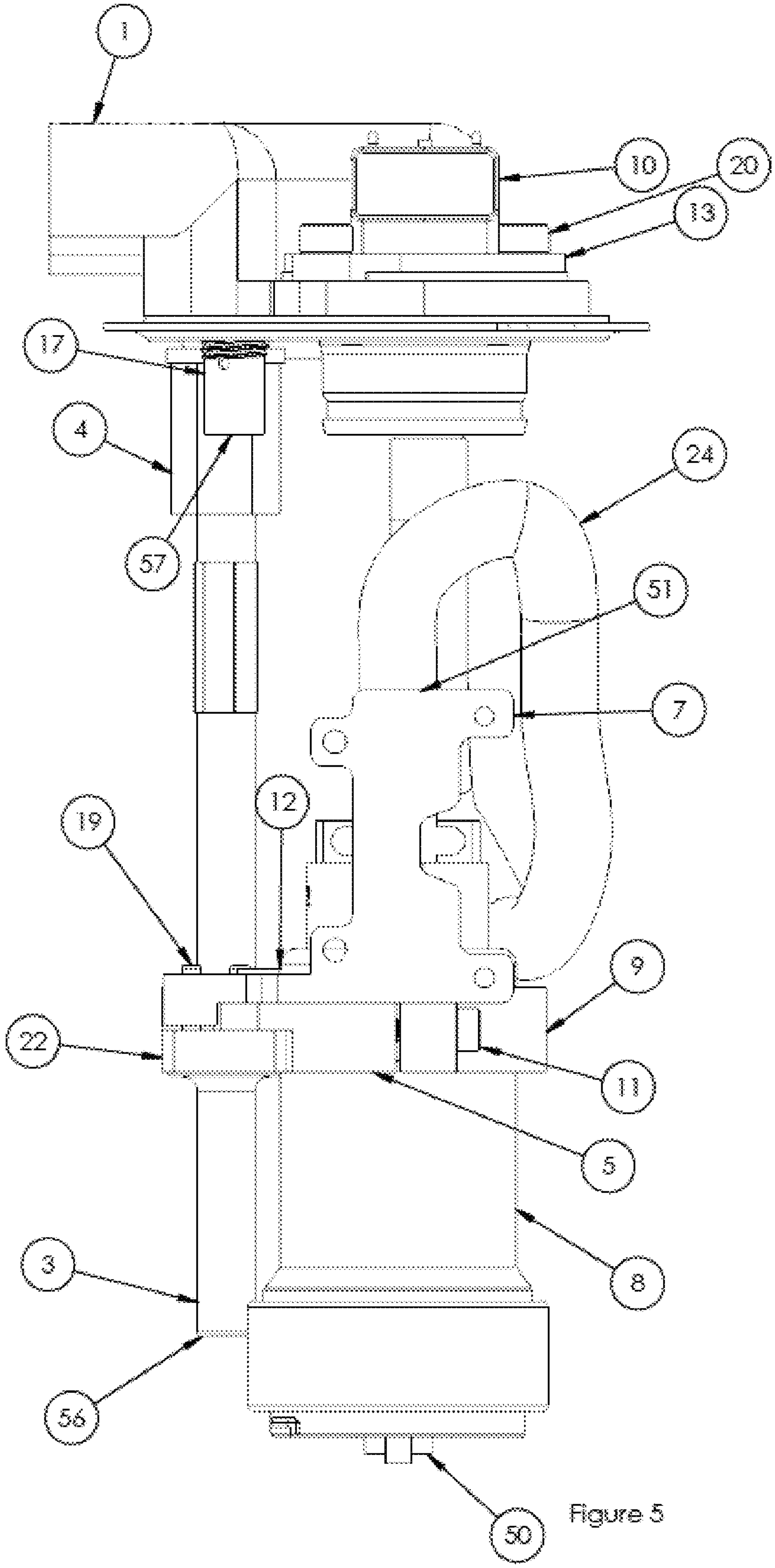
FIG. 5 is a front view of the hanger, and shows the side profile of the hanger head, in an alternative embodiment.
Figure 6:
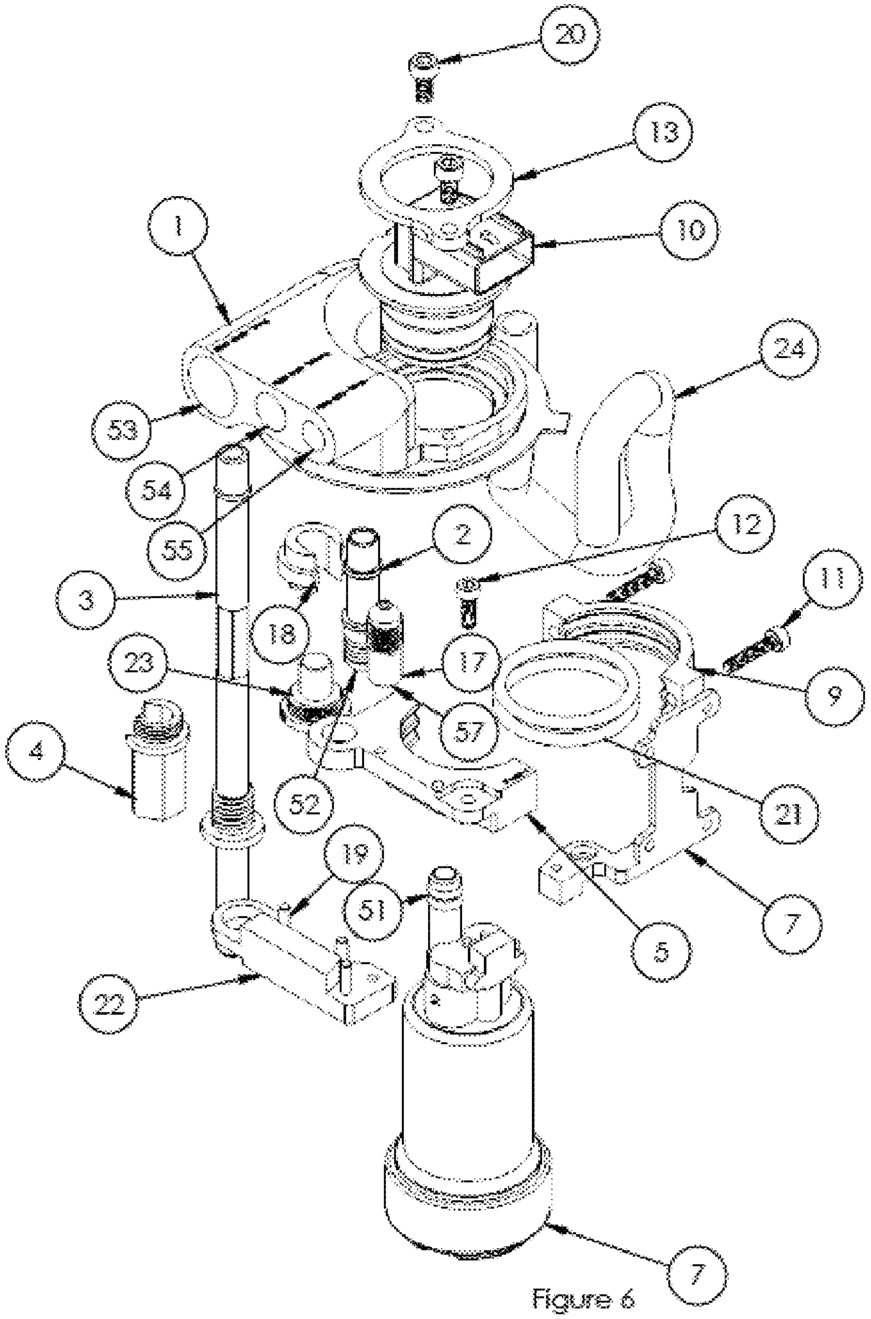
FIG. 6 is an exploded view of the hanger, showing all of the components.
Figure 7:
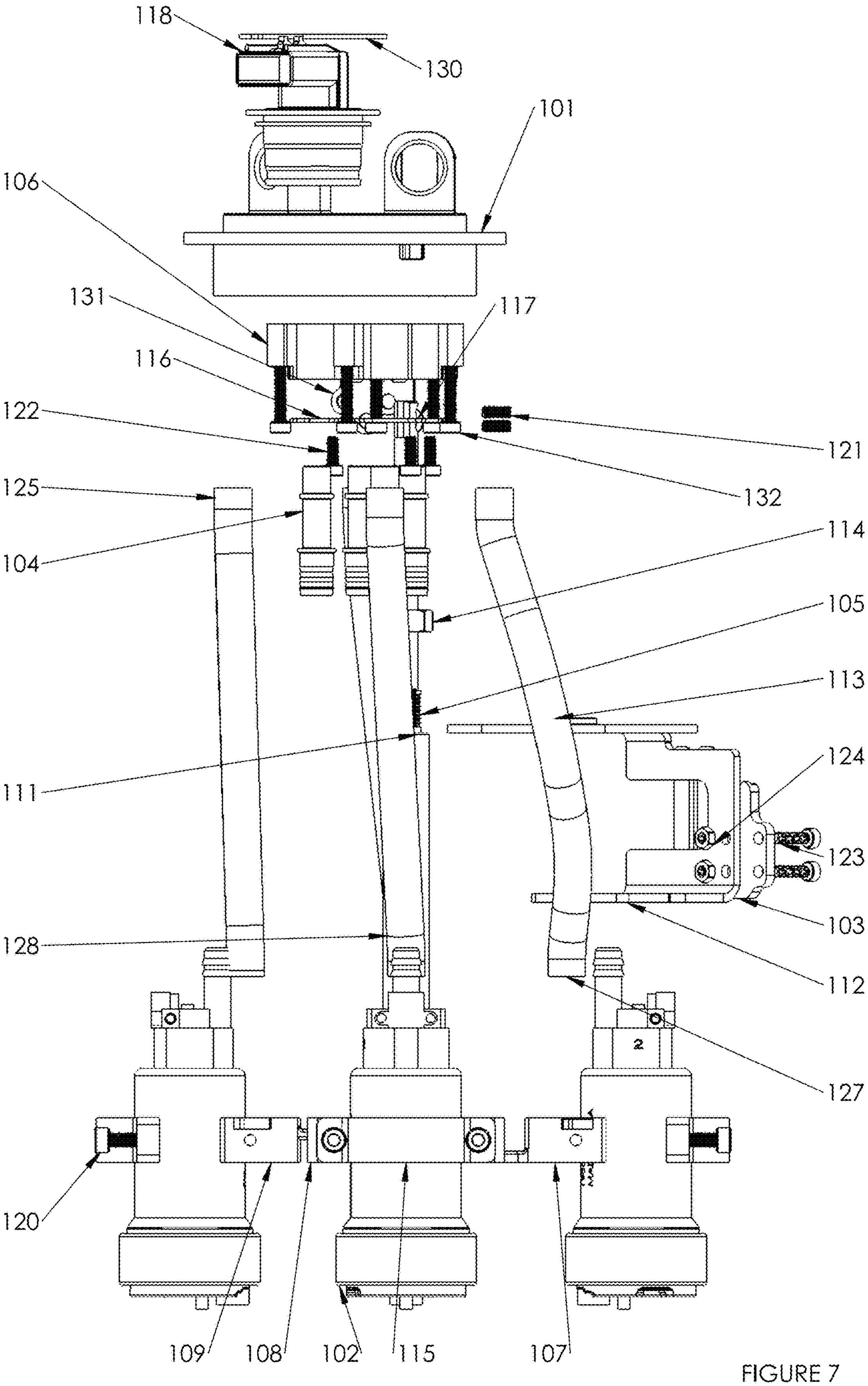
FIG. 7 is an elevation exploded view of an alternative fuel pump hanger.
Figure 8:
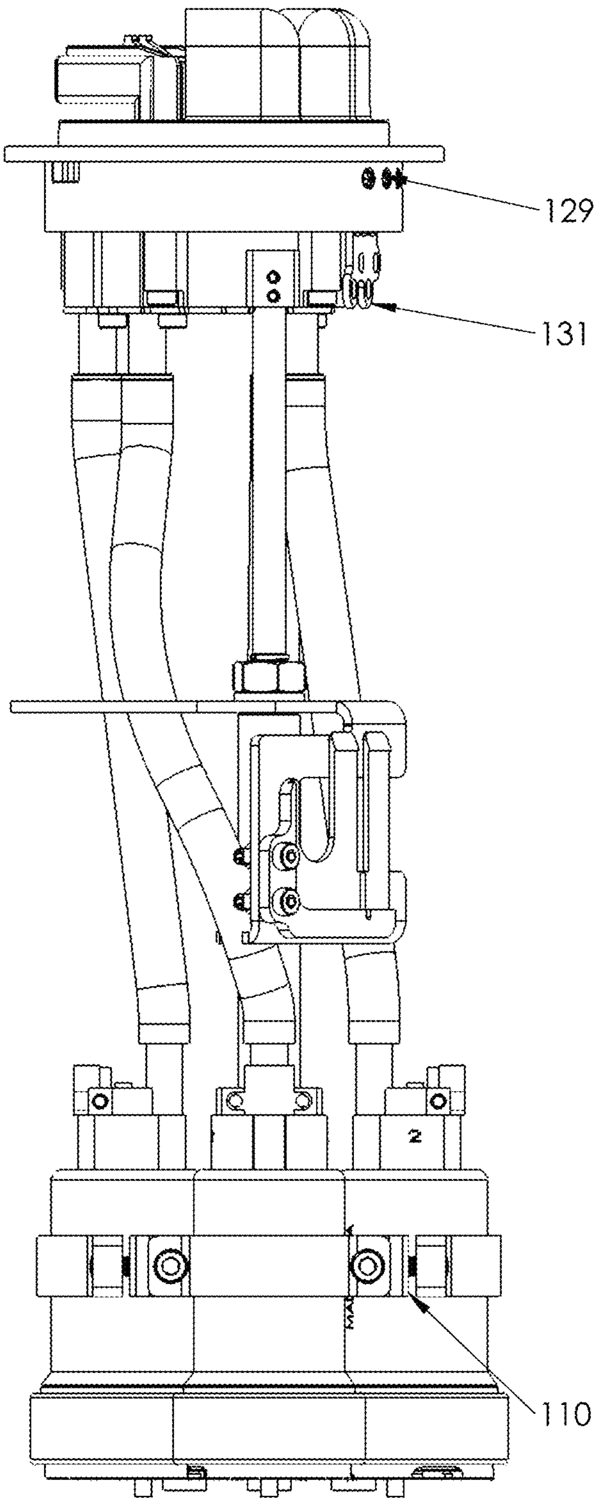
FIG. 8 is an elevation view of an alternative fuel pump hanger in assembled form.
Figure 9:
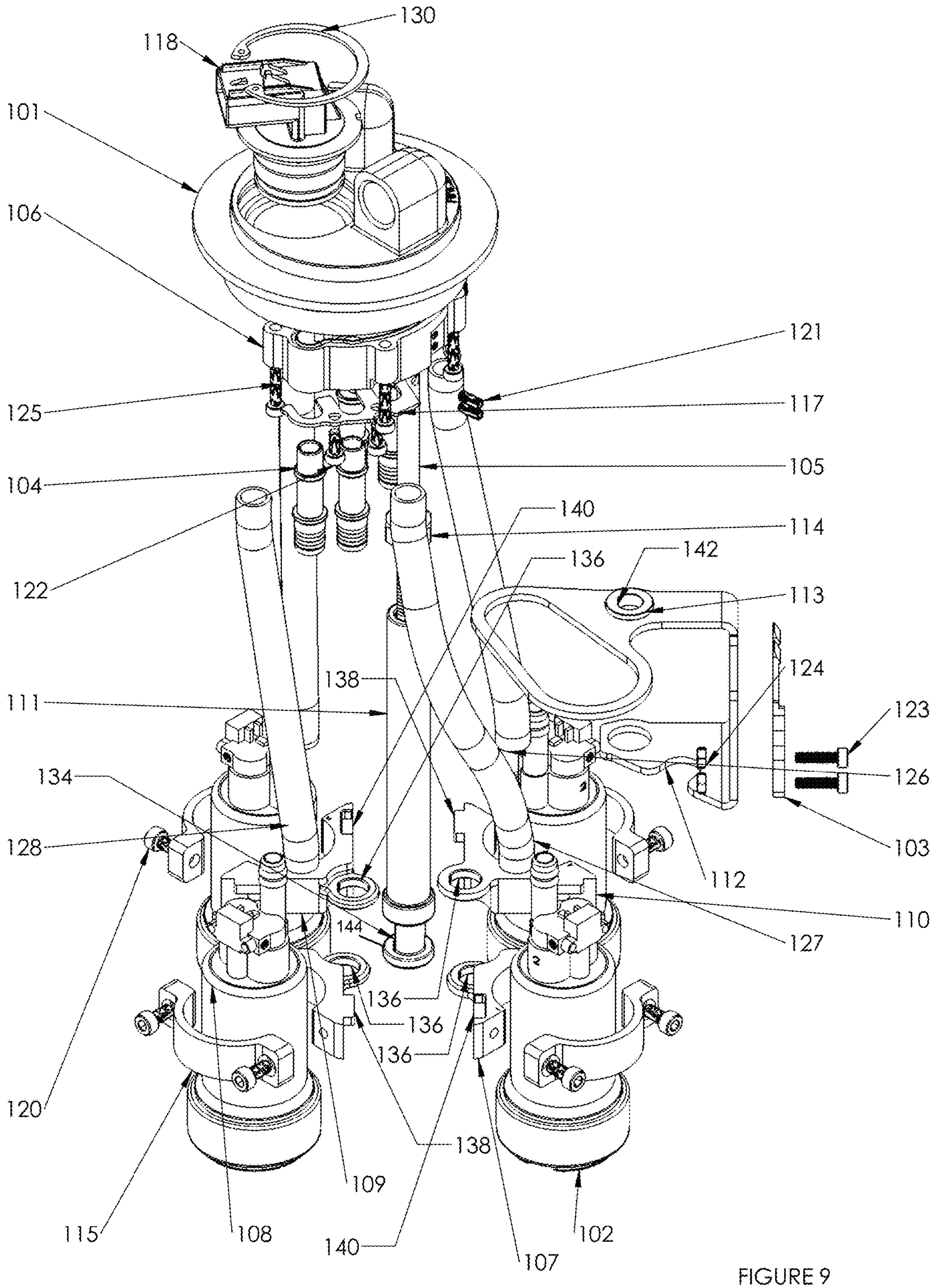
FIG. 9 is a top perspective exploded view of an alternative fuel pump hanger.
Figure 10:
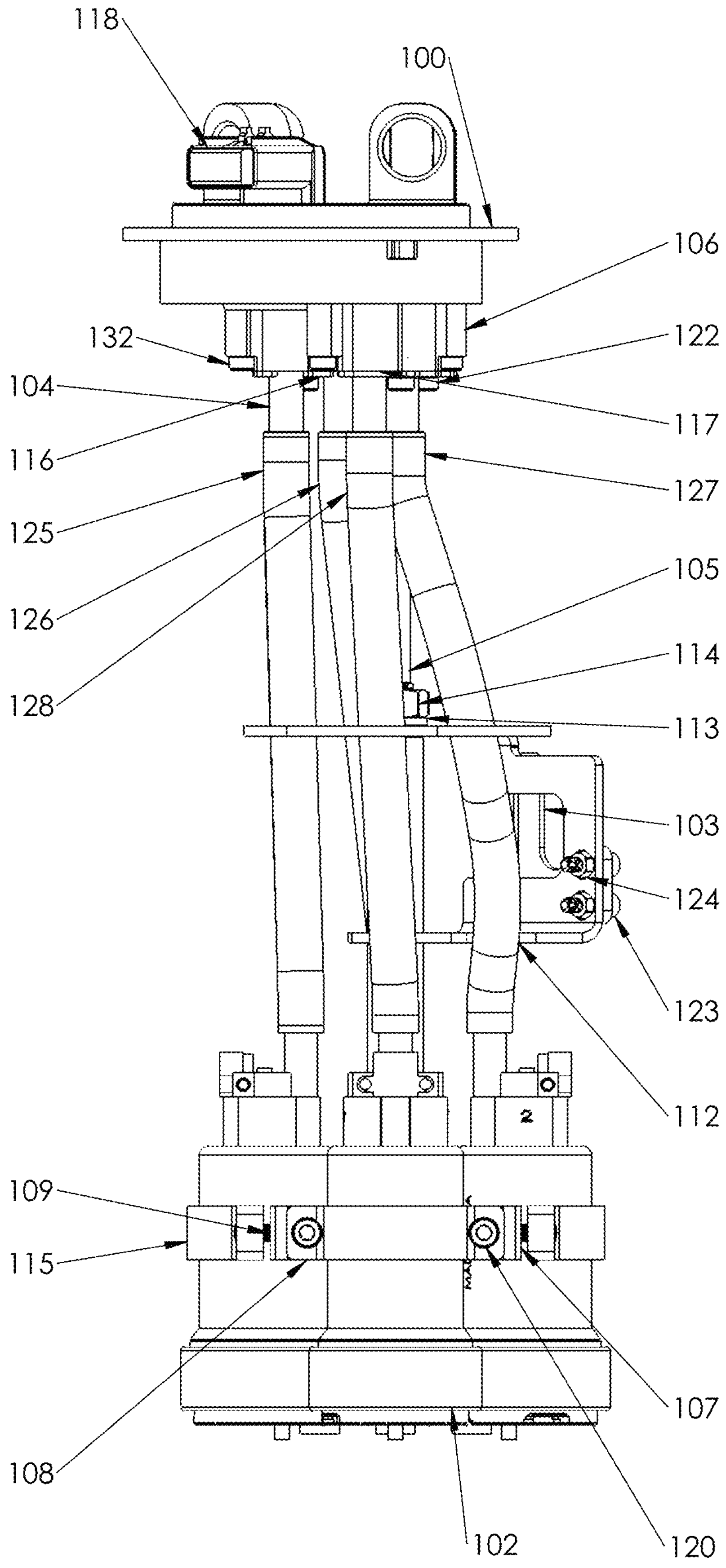
FIG. 10 is a second elevation view of an alternative fuel pump hanger in assembled form.

FIGS. 4, 5 and 6 show a different configuration with only one fuel pump instead of two. The change to one fuel pump requires some brackets and fittings to be swapped. Bracket 6 is replaced with Bracket 22. Bracket 22 permits elimination of the $1^{st}$ fuel pump while also maintaining proper spacing so that all the brackets can be assembled together. One of each fitting 2 and 18 is removed from the assembly and replaced with plug 23.

FIGS. 7-10 show an alternate embodiment of a fuel pump hanger assembly in which four fuel pumps can be suspended and positioned within a fuel tank. In this embodiment 101 is the top hat of the entire fuel pump hanger. It fastens to the fuel tank of the vehicle at its opening and supports all the components of the hanger assembly. The fuel feed and return lines are plumbed to the ports in the top hat. The pump clamps 115 clamp the fuel pumps 102 to each fuel pump bracket 107, 108, 109, and 110. The clamps are secured to the fuel pump bracket with bolts 120. A fuel tube 125 is crimped onto each fuel pump 102 and each quick disconnect barb 104. There is a connector 128 connecting each tube 125 to each pump 102. The first fuel pump 102 and corresponding fuel pump clamp assembly 107, 115, 120, 128, is placed over the top of shaft 105 such that opening 136 surrounds shaft 105 slides down to the bottom of shaft 105 onto shoulder 144 for supporting the fuel pump clamp assemblies. There is a keyed flat 134 on shaft 105 that aligns or locates the pump bracket 107 in the correct orientation or position. The shaft 105 and first fuel pump clamp assembly 107, 115, 120, 128, 102, is inserted into the opening of the fuel tank. The second fuel pump clamp assembly 108, 115, 120, 128, slides to the bottom of shaft 105 opening 136 as described above. The keyed flat 134 on shaft 105 aligns the second fuel pump clamp assembly 108, 115, 120, 128. The second fuel pump clamp 108 also connects to the first fuel pump clamp 107 via a locating feature which properly mutually positions and orients the first and second pumps relative to one another. In this embodiment this locating feature comprises protrusion 138 and cavity 140 sized and shaped to receive protrusion 138 therein to mutually locate the first and second fuel pumps and corresponding fuel pump clamp assemblies. The protrusion 138 and cavity 140 also serve as a weight spreader, as the force of gravity cause protrusion 138 to bear on the bottom surface of cavity 140. In this embodiment this same kind of locating and load spreading feature 138, 140 is present between second and third fuel pump clamp assemblies, between the third and fourth fuel pump clamp assemblies, and between the fourth and first fuel pump clamp assemblies.

The third fuel pump clamp assembly 109, 115, 120, 128, slides onto the bottom of shaft 105 as described above. The keyed flat 134 on shaft 105 aligns the third fuel pump clamp assembly 109, 115, 120, 128. The fourth fuel pump clamp assembly 110, 115, 120, 128, slides onto the bottom of shaft 5 as described above. The keyed flat 134 on shaft 105 aligns the fourth fuel pump clamp assembly 110, 115, 120, 128. Fuel pump brackets 107, 108, 109, and 110 are staggered in a fashion so they stack on top of each other (particularly rings 136 thereof) while maintaining an even height on all four fuel pumps 102.

Lower collar 111 slides down shaft 105. Level sensor assembly consists of 112, 113, 124, 123, and 103. Bushing 113 is welded to bracket 112. Bracket 103 allows for installation of a level sensor (not shown), e.g. a factory C6 Corvette level sensor. Bracket 103 is fastened to bracket 112 with bolt 123 and nut 124. Level Sensor assembly 112, 113, 124, 123, and 103, slides down shaft 105 and sits on top of lower collar 111. There is a flat key 142 on bushing 113 that locates the level sensor assembly 112, 113, 124, 123, and 103 in the correct orientation. Nut 114 is threaded onto the threads on shaft 105. This secures all of the pump brackets 107, 108, 109, 110 and lower collar 111 to the shaft 105 inside the small opening of the fuel tank.

Manifold 106 is bolted to the top hat 101 with bolts 132. An o-ring seals manifold 106 to top hat 101. Shaft 105 is inserted into a keyed hole in manifold 106. Two set screws 121 are threaded into manifold 106 and secure shaft 105 to manifold 106. All four barbs 104 are inserted into holes in manifold 106. O-rings in each hole seal barbs 104 to manifold 106. Comb locks 116 and 117 secure barbs 104 in the holes. Bolts 122 secure the comb locks to the manifold 106. Electrical bulkhead 118 is inserted into top hat 101, and secured by snap ring 130. A wiring harness (not shown) holding wires from the pumps is plugged into electrical bulkhead 118. Ground wires from each fuel pump 102 are connected to grounding comb 131. Grounding comb 131 grounds the electrical current to top hat 100. Grounding comb 131 is secured to top hat 101 with four set screws 129.

The entire assembly of this embodiment, once assembled within the confines of the OEM fuel tank, allows top hat 101 can be dropped into the fuel tank with a gasket underneath, and secured by the OEM lock ring.

The following clauses illustrate example subject matter described herein.

Clause 1. A fuel pump hanger comprising:

a top hat to be attached to a fuel tank and positioned at a fuel tank opening of the fuel tank;

an elongate shaft attachable to the top hat so as to extend away from the fuel tank opening into the fuel tank, the elongate shaft having thereon a bracket support that is positioned within the fuel tank when the shaft extends into the fuel tank;

a first bracket assembly, including a first fuel pump bracket for holding a first fuel pump, the first bracket assembly further including a first opening, associated with the first fuel pump bracket, through which the shaft extends to anchor the first fuel pump bracket to the shaft;

a second bracket assembly, including a second fuel pump bracket for holding a second fuel pump, the second bracket assembly further including a second opening, associated with the second fuel pump bracket, through which the shaft extends to anchor the second fuel pump bracket to the shaft;

a third bracket assembly, including a third fuel pump bracket for holding a third fuel pump, the third bracket assembly further including a third opening, associated with the third fuel pump bracket, through which the shaft extends to anchor the third fuel pump bracket to the shaft, the third bracket assembly further including a third locating feature for mating with the second locating feature to locate within the fuel tank the second fuel pump held by the second fuel pump bracket relative to the third fuel pump held by the third fuel pump bracket; and a fourth bracket assembly, including a fourth fuel pump bracket for holding a fourth fuel pump, the fourth bracket assembly further including a fourth opening, associated with the fourth fuel pump bracket, through which the shaft extends to anchor the fourth fuel pump bracket to the shaft, the fourth bracket assembly further including a fourth locating feature for mating with the third locating feature to locate within the fuel tank the third fuel pump held by the third fuel pump bracket relative to the fourth fuel pump held by the second fuel pump bracket;

a plurality of locating features associated with the first, second, third and fourth bracket assemblies, for locating the first, second, third and fourth fuel pumps relative to one another.

Clause 2. A fuel pump hanger as claimed in claim 1, wherein the plurality of locating features comprises a first set of locating features to locate within the fuel tank the second fuel pump relative to the first fuel pump, a second set of locating features to locate within the fuel tank the third fuel pump relative to the second fuel pump, a third set of locating features to locate within the fuel tank the fourth fuel pump relative to the third fuel pump, and a fourth set of locating features to locate within the fuel tank the first fuel pump relative to the fourth fuel pump.

Clause 3. A fuel pump hanger as claimed in claim 2, wherein the first set of locating features comprises a first cavity on the first bracket assembly and a first protrusion on the second bracket assembly sized, shaped and positioned to mate with the first cavity;

the second set of locating features comprises a second cavity on the second bracket assembly and a second protrusion on the third bracket assembly sized, shaped and positioned to mate with the second cavity;

the third set of locating features comprises a third cavity on the third bracket assembly and a third protrusion on the fourth bracket assembly sized, shaped and positioned to mate with the third cavity; and the fourth set of locating features comprises a fourth cavity on the fourth bracket assembly and a fourth protrusion on the first bracket assembly sized, shaped and positioned to mate with the fourth cavity.

Clause 4. A fuel pump hanger as claimed in claim 1, wherein the bracket support comprises a shoulder to support the first, second, third and fourth fuel pump brackets.

Clause 5. The fuel pump hanger as claimed in claim 1, wherein the fuel pump hanger comprises a bracket securing feature to secure the fuel pump brackets to the elongate shaft.

Clause 6. The fuel pump hanger as claimed in claim 5, wherein the bracket securing feature comprises threading on a surface of the elongate shaft, and a nut to mate with said threading to hold secure the fuel pump brackets on the elongate shaft.

Clause 7. A method of installing two fuel pumps using the fuel pump hanger of claim 1, the method comprising the steps of:

fastening the first fuel pump to the first bracket using the first bracket assembly;

fastening the second fuel pump to the second bracket using the second bracket assembly;

fastening the third fuel pump to the third bracket using the third bracket assembly; and fastening the fourth fuel pump to the fourth bracket using the first bracket assembly inserting the elongate shaft into the fuel tank;

placing the first bracket onto the elongate shaft and into the fuel tank by moving the first opening over a top end of the elongate shaft and moving the first bracket downward along the elongate shaft;

after placing the first bracket onto the elongate shaft, placing the second bracket onto the elongate shaft and into the fuel tank by moving the second opening over the top end of the elongate shaft and moving the second bracket downward along the elongate shaft;

after placing the second bracket onto the elongate shaft, placing the third bracket onto the elongate shaft and into the fuel tank by moving the third opening over the top end of the elongate shaft and moving the third bracket downward along the elongate shaft;

after placing the third bracket onto the elongate shaft, placing the fourth bracket onto the elongate shaft and into the fuel tank by moving the fourth opening over the top end of the elongate shaft and moving the fourth bracket downward along the elongate shaft;

using the plurality of locating features, mutually locating the first, second, third and fourth fuel pumps;

attaching the elongate shaft to the top hat;

fastening a fuel feed line from each fuel pump to the top hat, and fastening the top hat to the fuel tank at the fuel tank opening.

The invention claimed is:

1. A fuel pump hanger comprising:

a top hat to be attached to a fuel tank and positioned at a fuel tank opening of the fuel tank; an elongate shaft attachable to the top hat so as to extend away from the fuel tank opening into the fuel tank, the elongate shaft having thereon a bracket support that is positioned within the fuel tank when the shaft extends into the fuel tank;

a first bracket assembly, including a first fuel pump bracket for holding a first fuel pump, the first bracket assembly further including a first opening, associated with the first fuel pump bracket, through which the shaft extends to anchor the first fuel pump bracket to the shaft;

a second bracket assembly, including a second fuel pump bracket for holding a second fuel pump, the second bracket assembly further including a second opening, associated with the second fuel pump bracket, through which the shaft extends to anchor the second fuel pump bracket to the shaft;

a third bracket assembly, including a third fuel pump bracket for holding a third fuel pump, the third bracket assembly further including a third opening, associated with the third fuel pump bracket, through which the shaft extends to anchor the third fuel pump bracket to the shaft, a fourth bracket assembly, including a fourth fuel pump bracket for holding a fourth fuel pump, the fourth bracket assembly further including a fourth opening, associated with the fourth fuel pump bracket, through which the shaft extends to anchor the fourth fuel pump bracket to the shaft, a plurality of locating features associated with the first, second, third and fourth bracket assemblies, for locating the first, second, third and fourth fuel pumps relative to one another, the third bracket assembly further including a third locating feature for mating with the second locating feature to locate within the fuel tank the second fuel pump held by the second fuel pump bracket relative to the third fuel pump held by the third fuel pump bracket; and the fourth bracket assembly further including a fourth locating feature for mating with the third locating feature to locate within the fuel tank the third fuel pump held by the third fuel pump bracket relative to the fourth fuel pump held by the second fuel pump bracket.

2. A fuel pump hanger as claimed in claim 1, wherein the plurality of locating features comprises a first set of locating features to locate within the fuel tank the second fuel pump relative to the first fuel pump, a second set of locating features to locate within the fuel tank the third fuel pump relative to the second fuel pump, a third set of locating features to locate within the fuel tank the fourth fuel pump relative to the third fuel pump, and a fourth set of locating features to locate within the fuel tank the first fuel pump relative to the fourth fuel pump.

3. A fuel pump hanger as claimed in claim 2, wherein the first set of locating features comprises a first cavity on the first bracket assembly and a first protrusion on the second bracket assembly sized, shaped and positioned to mate with the first cavity;

the second set of locating features comprises a second cavity on the second bracket assembly and a second protrusion on the third bracket assembly sized, shaped and positioned to mate with the second cavity;

the third set of locating features comprises a third cavity on the third bracket assembly and a third protrusion on the fourth bracket assembly sized, shaped and positioned to mate with the third cavity; and the fourth set of locating features comprises a fourth cavity on the fourth bracket assembly and a fourth protrusion on the first bracket assembly sized, shaped and positioned to mate with the fourth cavity.

4. A fuel pump hanger as claimed in claim 1, wherein the bracket support comprises a shoulder to support the first, second, third and fourth fuel pump brackets.

5. The fuel pump hanger as claimed in claim 1, wherein the fuel pump hanger comprises a bracket securing feature to secure the fuel pump brackets to the elongate shaft.

6. The fuel pump hanger as claimed in claim 5, wherein the bracket securing feature comprises threading on a surface of the elongate shaft, and a nut to mate with said threading to hold secure the fuel pump brackets on the elongate shaft.

7. A method of installing two fuel pumps using the fuel pump hanger of claim 1, the method comprising the steps of:

fastening the first fuel pump to the first bracket using the first bracket assembly;

fastening the second fuel pump to the second bracket using the second bracket assembly;

fastening the third fuel pump to the third bracket using the third bracket assembly; and fastening the fourth fuel pump to the fourth bracket using the first bracket assembly inserting the elongate shaft into the fuel tank;

placing the first bracket onto the elongate shaft and into the fuel tank by moving the first opening over a top end of the elongate shaft and moving the first bracket downward along the elongate shaft;

after placing the first bracket onto the elongate shaft, placing the second bracket onto the elongate shaft and into the fuel tank by moving the second opening over the top end of the elongate shaft and moving the second bracket downward along the elongate shaft;

after placing the second bracket onto the elongate shaft, placing the third bracket onto the elongate shaft and into the fuel tank by moving the third opening over the top end of the elongate shaft and moving the third bracket downward along the elongate shaft;

after placing the third bracket onto the elongate shaft, placing the fourth bracket onto the elongate shaft and into the fuel tank by moving the fourth opening over the top end of the elongate shaft and moving the fourth bracket downward along the elongate shaft;

using the plurality of locating features, mutually locating the first, second, third and fourth fuel pumps;

attaching the elongate shaft to the top hat;

fastening a fuel feed line from each fuel pump to the top hat and fastening the top hat to the fuel tank at the fuel tank opening.

* * * * *